Nov. 6, 1956

F. J. MAAS 2,769,505

ELECTRICAL PRECIPITATION APPARATUS
FOR PROTECTIVE RESPIRATORS

Filed March 29, 1952

INVENTOR:
Friedrich Julius Maas
By
Richards Geier
ATTORNEYS

Nov. 6, 1956  F. J. MAAS  2,769,505
ELECTRICAL PRECIPITATION APPARATUS
FOR PROTECTIVE RESPIRATORS
Filed March 29, 1952  5 Sheets-Sheet 5

INVENTOR:
Friedrich Julius Maas
BY
Richards Geier
ATTORNEYS

United States Patent Office 2,769,505
Patented Nov. 6, 1956

2,769,505

ELECTRICAL PRECIPITATION APPARATUS FOR PROTECTIVE RESPIRATORS

Friedrich Julius Maas, Zurich, Switzerland, assignor to Société Financière d'Expansion Commerciale et Industrielle S. A. "Sfindex," Sarnen, Switzerland, a company of Switzerland Application March 29, 1952, Serial No. 281,404

Claims priority, application Switzerland April 26, 1951

16 Claims. (Cl. 183—7)

The present invention relates to a portable protective respirator with an electrostatic filter and radioactive ionizer for the separation of any solid and/or liquid particles which may be entrained by the stream of air to be inhaled.

In addition to known respirators functioning on the principle of purely mechanical filtering, there exists a purely theoretical proposal, only realizable at great expense, of a portable protective respirator with an electrostatic filter. Such or electric filters rest on the principle of the ionization of the air molecules on the entry into the apparatus of the current of air to be purified, so that the atmospheric ions will in turn electrically charge the particles of foreign matter entrained by the current of air, so that in an electrode system through which the current of air is conducted together with the charged particles the said particles will be deflected laterally out of the current of air towards the electrodes owing to the electrical field prevailing in said electrode system and directed transversally to the direction of flow of the current of air, and will be precipitated on the electrodes and remain adhering thereto. Various means such as electrical glow-discharges, thermal ionization, ionizing irradiation, etc., for the production of atmospheric ions are known, and in the aforementioned proposal of a portable protective respirator with an electrostatic filter, capsules containing radioactive substances are used for this purpose. The enclosure of the said radioactive substances in capsules is done in order to retain the gaseous products of disintegration of the radioactive substances, but at the same time it is stated that the ionizating radiations are absorbed only in slight degree on their passage through the walls of the capsules. Not retained by such capsules, however, are the high-penetration gamma-rays which are generally emitted by radioactive substances and constitute a danger to the health of the wearer of such a respirator, not only when he or she is actually wearing the respirator or mask, but also during transport if the said respirator or mask is carried by the user. This danger to health is such a material disadvantage of the constructive proposal in question that, even for this reason alone, its technical realization appears doubtful. In addition, however, the electrode system proposed for separating the charged particles entrained by the current of air is encumbered with material defects in that it lacks precisely the advantage of low resistance to air flow exhibited by the conventional electrofilters and in that no devices of any kind are provided for the treatment of the electrode system after prolonged use and the accumulation therein of appreciable quantities of dust. Also entirely lacking, finally, is any provision enabling the functioning of the electrofilter to be verified by the user, so as to give the latter the vitally necessary assurance that the filter is functioning correctly and is accordingly affording him or her protection.

As against the aforementioned fundamental defects which stand in the way of the technical realization of a protective respirator with an electrofilter and a radioactive ionizer, the present invention provides a novel construction of such an electrostatic respirator which has been fully developed and tested technically and exhibits none of the aforementioned fundamental defects.

The inventive protective respirator is characterized by the fact that the respiratory air breathed in through the protective respirator enters through a radioactive ionizer which is fitted at the front of the respirator and consists of a coating of radioactive substances predominantly emitting alpha rays and emitting only negligibly small amounts of gamma radiation, and more specially consisting of radium-D enriched with polonium, additional means being provided which generate in the ionizer space an electrical field with flux lines predominantly directed transversely to the direction of flow of the air, the alpha emission forming a large number of atmospheric ions which in turn charge electrically the solid and liquid particles of foreign matter entrained by the current of air, and the current of air together with the particles of foreign matter being then guided by baffle surfaces, behind the ionizer chamber, on to the active cross-sectional area of a plurality of mutually similar and serially-arranged electrode systems designed as an exchangeable filter cartridge, each of which said electrode systems consists of two metallic strips wound together, with insulating spacers interposed therebetween, about a mandrel of circular cross-section disposed in the direction of flow of the current of air, whereby annular, concentric, and spirally-proceeding interspaces, subdivided by the insulating spacers into separate channels for the stream of air are formed, in each of which an electrical field prevails which is produced by a source of direct-current electrical potential connected to the two metallic strips, the lines of electric flux proceeding transversely to the direction of flow of the air flowing in the interspaces and a deflecting force acting in the direction towards the metallic strips being accordingly exerted on the electrically charged particles of foreign matter, in which said direction the said particles of foreign matter travel, to be finally precipitated upon and remain adhering to the said metallic strips.

The protective respirator in accordance with the present invention is represented in Figures 1 to 15 of the accompanying drawing, in which.

Figure 1:
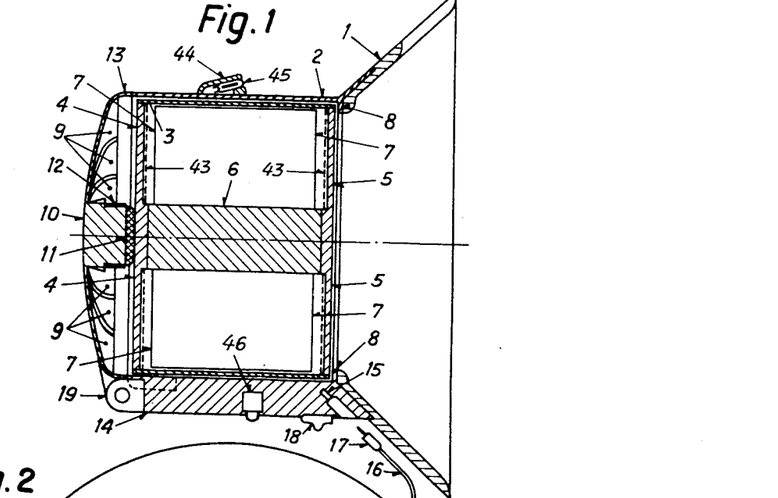
Figures 1 and 2 represent the respirator in longitudinal sectional view and in front elevational view respectively.

Figure 1 depicts schematically in longitudinal sectional view and on a somewhat reduced scale the construction of a typical embodiment of the protective respirator. A mask 1 adapted to the facial form and made of a material, such as soft rubber, which adapts itself to the shape of objects to which it is applied, is provided with a tubular extension 2 gastightly connected thereto and made either of metal or of synthetic materials of sufficient strength, but preferably of a particularly light material. Within the tubular extension 2 is a removable, box-like insert or cartridge consisting of a tube 3 of insulating material as its wall, a front and a rear closing lid, 4 and 5 respectively, each formed of separate radial ribs, and a core 6 of circular cross section, so that between the said core and the said outer wall 3 a clear space is provided which is filled by the electrode system of the separator, which electrode system is indicated in Figure 1 only by its outline 7 but is described in detail hereunder. The tubular extension 2 is connected to the mask 1 with a ring 3 which serves as a locating stop for the box-like insert or cartridge.

The tubular extension 2 is closed at its fore end by a hinged lid which has broad, for example sector-shaped air-intake apertures 9 and a core-member 10, of circular cross-section, of approximately the same diameter as the core 6 of the separator cartridge. The said core member 10 has on its end face a resilient structure, shown in Figure 1 as a rubber buffer 11 by way of example, which, with the lid closed, presses the separator cartridge gently against the annular locating stop 8. Further provided, in a recess of the core member 10, is a narrow and strip-shaped coating, extending completely round the periphery of the said core member 10, of a radioactive substance which emits predominantly alpha rays and only a relatively slight amount of gamma radiation. The alpha emission of the strip-shaped coating pervades the entire space between the core member 10 and the outer edge 13 of the hinged lid, through which space the intake air must pass on its way to the separator cartridge. The distance between the core member 10 and the edge 13 of the lid is such as not at any point to be greater than the so-called "maximum range" in air of the alpha emission proceeding from the radioactive coating 12, so that no part of the cross-sectional area of flow of the air within the lid is free from radioactive alpha-irradiation. By slight tapering of the core member 10 immediately before the radioactive coating 12 embedded in the core member 10, any formation on the surface of the coating 12 of a deposit of solid and/or liquid particles of foreign matter entrained by the entering stream of air, which deposit might cause appreciable absorption of the alpha radiation, is avoided.

On its under face the tubular extension 2 has a rib 14 of insulating material carrying at one side the contact devices for the electrical supply leads to the electrode system of the exchangeable separator cartridge and at the other side the double plug-sockets 15 for the miniature double-pin plug 17 through which the electrical potential is supplied from the power unit via the flexible cord 16. A spring-action fixing bolt 18 is provided to hold the double-pin plug 17 securely in position in the plug sockets 15. The front end face of the rib 14 is designed as a hinge 19 for the hinged lid of the tubular extension 2.

Figure 2:
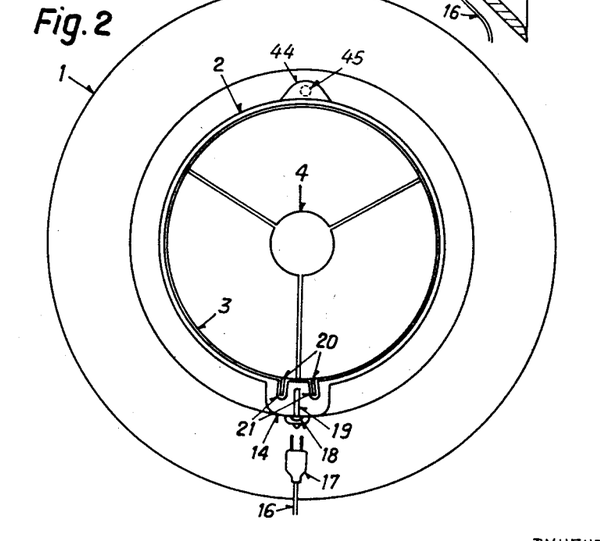

Figure 2 shows a front elevational view of the protective respirator with the closing lid of the tubular extension 2 removed and the front closing lid 4 of the exchangeable separator cartridge visible with the radial ribs, of which in the figure only three are shown as examples. The outer wall 3 of the separator cartridge is provided with two contact blades 20 for the supply of electrical potential to the separator electrodes. The said contact blades 20 each engage in a slot 21 of the insulating rib 14, said slots being provided with resilient contact plates which, in turn, are electrically connected to the two plug-sockets 15.

Figure 3:
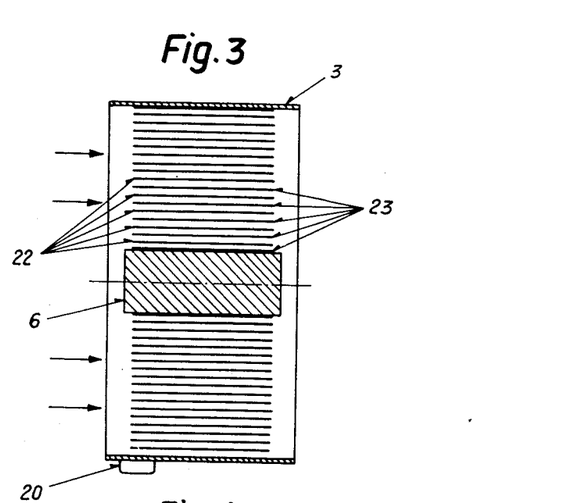
Figs. 3 and 4 diagrammatically represent the exchangeable separator.
Figure 4:
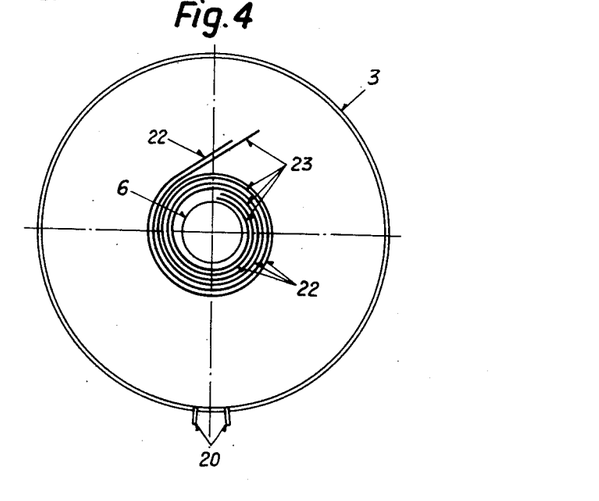

The exchangeable separator cartridge and the electrode system incorporated therein are shown diagrammatically, in a typical embodiment, in sectional view in Figure 3 and in front elevational view in Figure 4; the front and rear closing lids being omitted for the sake of clarity. The space between the core 6 and the wall 3, both of which are made of electrically insulating material, is filled by the electrode system, which in the present typical embodiment consists of two metallic strips 22 and 23 which are so prepared that, with a clearance of one to two millimetres maintained between them, can be wrapped spirally round the core 6, so that on completion the entire space is filled with concentrically nested, tubular metallic electrodes through the interspaces of which the air can flow in the direction indicated by the arrows, said interspaces being laterally defined at all points within the electrode system by the electrode 22 on one side and by the electrode 23 on the other. If the two electrode strips 22 and 23, which have no point of mutual contact, are connected each to one of the two contact blades 20 and the two poles of a source of electrical potential of the order of 1000 volts are applied to the said contact blades, there will be created in each of the numerous interspaces an electrical field the flux lines of which will proceed transversally to the direction of travel of the air flowing therethrough. The said electrical field will exert on any charged solid and/or liquid particles of foreign matter entrained by the current of air a deflecting force acting in the direction towards the electrodes, so that the said particles of foreign matter will migrate towards the electrodes, be precipitated thereupon, and remain adhering thereto.

Figure 5:
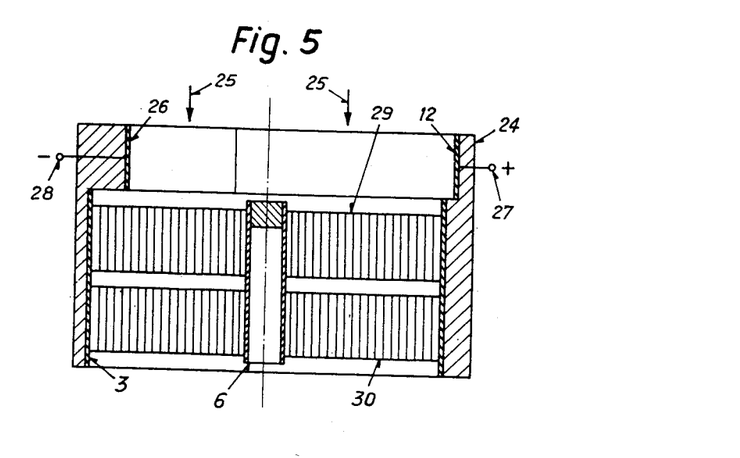
Figs. 5 and 6 show a longitudinal sectional view and a front elevational view respectively of one embodiment of a radio-active ionizer with electrostatic filter.
Figure 6:
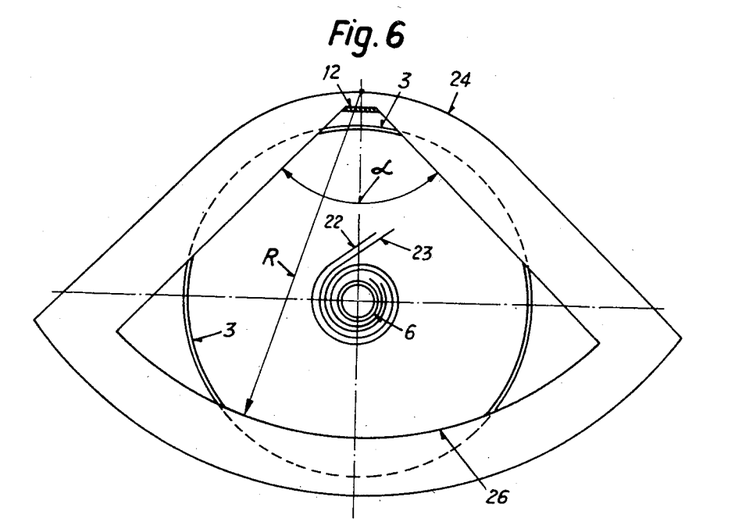

In the radioactive ionizer depicted in Figures 1 and 2, no supplementary means are provided for superimposing an electrical field on the radioactively irradiated cross-sectional area. Such a construction, particularly effective, of the radioactive ionizer is shown diagrammatically in longitudinal sectional view in Figure 5 and in front elevational view in Figure 6, the cross-section of the ionizer being sector-shaped, with the radioactive coating 12 at the apex. The ionizer chamber is here formed by a sector-shaped opening in a body 24 made of electrically non-conducting material and has a vertex angle (see Figure 6) of at least 90°. What is achieved by this form of cross-section of the ionizer, which latter the air enters in the direction indicated by the arrow 25 (see Figure 5), is that as large as possible a proportion of the alpha-emission emanating from the radioactive coating 12 is made use of for the intensive ionization of the current of air. The coating 12, consisting of radioactive substances predominantly emitting alpha radiation emits that radiation not only perpendicularly to its surface, but in all directions. If the radioactive coating 12 takes, by way of example and as shown in Figures 5 and 6, the form of a very thin layer of radioactive material on a metallic carrier material and under a thin covering layer only very slightly absorbent in respect of the alpha particles, but gas-tight, there will in fact be produced in the plane of the drawing of Figure 6 practically uniformly intense radioactive irradiation throughout the range of the angle if the angle is of the order of from 90° to about 120°. The radius R of the sector-shaped ionizer chamber (see Figure 6) depends, in respect of its length, on the energy of the alpha-radiation emitted by the radioactive coating 12, and must be somewhat greater than the maximum range in air of the most energetic component of the alpha-radiation emitted by the radioactive coating 12, and must be somewhat greater than the maximum range in air of the most energetic component of the alpha-radiation, this value being precisely known in respect of the various radioactive substances.

The arc-shaped periphery, opposite the radioactive coating 12, of the sectoral cross-section is provided with a metallic coating 26 which is of the same axial extent as the radioactive substance 12, and the metallic coating 26, are each connected to connecting terminals 27 and 28 respectively (see Figure 5) which in turn are connected to the poles of a source of electrical potential; for instance, the terminal 27 to the positive pole and the terminal 28 to the negative pole of said source. There then arises between the radioactive coating 12 and the metallic coating 26, which acts as a counter-electrode, an electrical field whose flux lines radially permeate the sectoral chamber and proceed predominantly in a direction transversal to that of the flow of the air. The alpha particles themselves are practically unaffected by the said electrical field, but the ionized atmospheric ions generated throughout the ionizer chamber by the alpha particles are set in motion co-directionally with the flux lines, which causes an intensification of the electrical charges of the solid and/or liquid particles of foreign matter entrained by the current of air through the ionizer chamber, in respect of both number and magnitude of the charges. By embedding the radioactive coating 12, together with its metallic carrier, in the insulating member 24, deposition of particles of foreign matter upon the radioactive coating is prevented, so that even where the respirator is in prolonged use, weakening of the alpha-emission by such deposits of material is avoided.

The air emerging from the sector-shaped ionizer chamber, together with the solid and/or liquid particles of foreign matter—now electrically charged—entrained thereby, passes into the electrode system, which in Figures 5 and 6 is diagrammatically represented, by way of example, by two mutually similar separator systems 29 and 30 which are disposed in the tube 3 one behind the other and a short distance apart and built up round a common tube or mandrel 6. The entire dual separator in the tube 3 can be withdrawn from the ionizer casing 24 as a box-like unit for the purpose of replacing it with a new one after prolonged use. The outer tube 3 and the inner tube 6 are, in the typical embodiment shown in the drawing, both of metal and each conductively connected to one of the two mutually insulated electrode strips 22 and 23 of the separator, so that they can at the same time be used as conductors supplying current to the dual separator.

Figure 7:
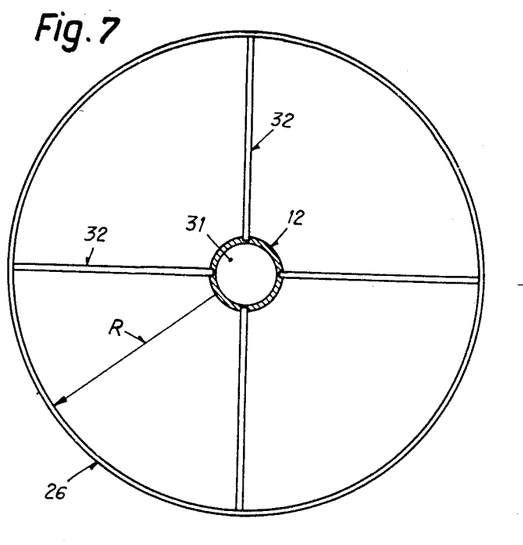
Figs. 7 and 8 show another embodiment of the ionizer and separator in axial section.
Figure 8:
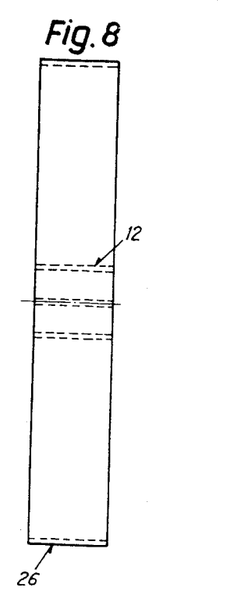

Particularly efficient utilization of the available space is rendered possible by the ionizer construction shown diagrammatically in Figures 7 and 8, in which construction four separate sector-shaped ionizers each with a vertex angle of 90° and identical radial clearance R between the radioactive coating 12 and the counter-electrode 26 are assembled to form an ionizer of circular cross-section. The ionizer is then formed by the metallic mandrel 31, which is held concentrically in the metal tube 26 by four supports or spokes 32 of electrically non-conducting material and serves at the same time as the carrier for the four coatings 12 of radioactive substances. Between the mandrel 31 and the tube 26—the latter acting as a counter-electrode—a direct-current potential is applied. According to the width of the radioactive coating 12, the insulating spokes 32 may also be a wedge shape, with a greater width at the point of connection to the mandrel 31. In the ionizer of circular cross-section in accordance with Figures 7 and 8, it is expedient to make the separator appertaining thereto of approximately equal circular cross-section and cross-sectional area.

The electrical field superimposed upon the radioactively irradiated cross-section of the ionizer should have a field strength of several hundred volts per centimetre, positive potential being preferable at the metallic carrier of the radioactive coating. According to the maximum range of the alpha emission of the radioactive coating, and to the distance, suited thereto, separating the counter-electrode of the ionizer from the emitting layer, an electrical tension of from about 1000 volts to several thousand volts is necessary for the ionizer field. If the electrode system in the separator is suitably dimensioned, the potential necessary for it will be of the same order of magnitude as that required by the ionizer, so that a common source of potential can be used.

Figure 9:
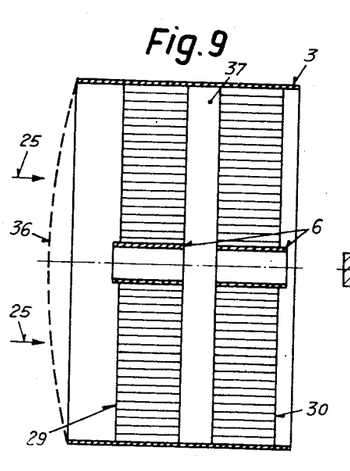
Figures 9 and 10 show a further modification with two axially spaced separators.
Figure 10:
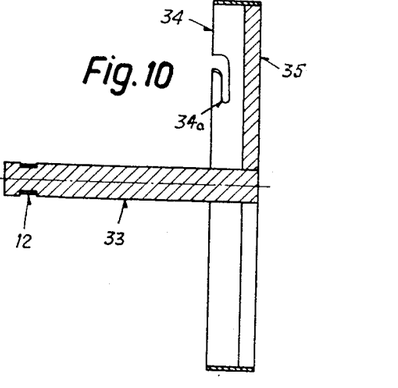
Figure 11:
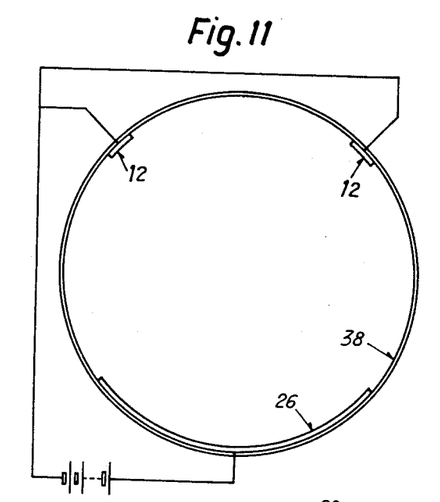
Figs. 11 and 12 show another embodiment in front view and axial section respectively of the ionizer.
Figure 12:
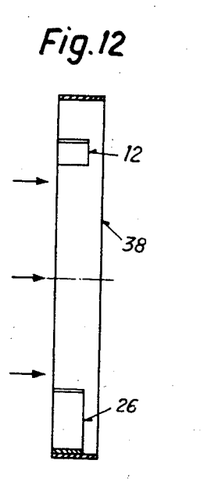

Figures 9 and 10 show diagrammatically an ionizer construction in which the separator potential can also be used for the ionizer. Here the separator consists of two like systems 29 and 30 arranged in a common metal tube 3 which at the same time acts as a conductor for the potential to one electrode of both parts of the separator, whilst the other electrodes of the separators are each connected to a thin metal tube 6 which constitutes the mandrel for the building-up of the wound separator electrode systems. The ionizer is shown in longitudinal sectional view in Figure 10 and consists of a metal rod 33 of circular cross-section which can be pushed through the tubes 6 of the separators and serves as a support for an annular radioactive coating 12. The two-part separator system in the tube 3 is mounted on the metal mandrel 33 and clamped in a metal ring 34 with a slot 34a in the manner of a bayonet closure. The metal ring 34 is secured to the metal mandrel 33 by means of three or more ribs 35, which are so narrow that they offer no appreciable resistance to the air flowing through the separator in the direction of the arrows 25. In the assembled condition, the radioactive coating 12 on the metal mandrel 33 projects forwardly out of the separator 29 and causes radioactive irradiation of the circular chamber between the metal mandrel 33 and the forward part of the metal tube 3. The metal mandrel 33 and the metal ring 34 act at the same time as leads for the potential to the two sections of the separator and are connected respectively to the positive and the negative pole of the source of potential. Through this, however, a radially-directed electrical field is superimposed on the circular ionizer chamber in front of the first separator 29.

In the typical embodiment of a radioactive ionizer and dual separator shown in Figures 9 and 10, the structural part carrying the radioactive coating 12 and comprising the metal rod 33, the metal ring 34 and radial insulating spokes 35 can be rigidly connected to the face-fitting portion of the protective mask, and the box-like container containing the separator systems 29 and 30 can be exchanged in a simple manner by being withdrawn in the forward direction. An air-permeable front, indicated by the discontinuous line 36 in Figure 9, of the exchangeable, box-like separator protects the electrode system of the separator, during use, from mechanical damage and from the entry of coarse particles and of splashes of water. In order to prevent distortions of the electrical field, an electrically non-conducting material should be used for the manufacture of the aforesaid perforated front.

In order to improve the separatory efficiency in respect of particularly small solid and/or liquid particles, it is of advantage to make, in the air gap 37 between the two separators 29 and 30 of Figure 9, provision for further radially-acting ionization. For this purpose all that is necessary is to provide the round metal rod 33 (see Figure 10) at the appropriate site with a second annular coating of radioactive substances, the said annular coating being recessed somewhat into the surface of the metal. The action of a radioactive ionizer is intensified if the full range in air of the major portion of the alpha particles emitted by the sources of radiation is made use of. A typical embodiment of an ionizer, of circular cross-section and having more than one source of radiation, in which this condition is met is shown in front elevational view in Figure 11 and in longitudinal sectional view in Figure 12. The sources 12 of radiation, here, by way of example, two in number, are disposed on the inside of an insulating tube 38 and opposite a metallic coating 26 which acts as the counter-electrode. Each of the sources 12 of radiation is, again, a coating of radioactive substances, predominantly emitting alpha radiation, gas-tightly applied upon a narrow metallic strip. All the sources 12 of radiation are connected via their metallic supports to one pole, and the counter-electrode 26 to the other pole, of a source of alternating-current voltage. In the typical embodiments of ionizers depicted in Figures 5 to 12, stops or screens can be provided at the air intake side which prevent the air from entering at those points in the cross-sectional area of the ionizer where the ionization of the air would be insufficient.

The preparation of the metallic, strip-shaped electrodes 22 and 23 (see Figure 4) of the electrode systems of wrapped or coiled construction used in the respirator can be effected by a wide variety of methods, but the separatory efficiency of the device will vary very widely according to the method of preparation utilized. The most effective methods of construction are diagrammatically represented in Figures 13 to 15 and described in the following.

Figure 13:
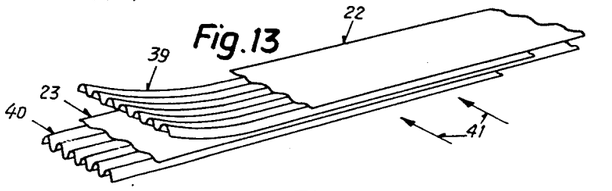
Fig. 13 is a perspective view of one embodiment of the separator elements.

A typical embodiment of the two electrode strips 22 and 23 and of the insulating spacers 39 and 40 is shown in diagrammatic perspective view in Figure 13. The said four strips are jointly wound round a central mandrel in the manner indicated diagrammatically in Figure 4. The electrode strips 22 and 23 consist of thin and flexible metallic foil of sufficient strength to withstand the longitudinal corrugations of the intermediate layers 39 and 40. The intermediate layers 39 and 40 are made, for example, of a plastic or textile fabric of sufficient stiffness to retain permanently the longitudinal corrugations produced in it by an embossing process. In order to stiffen the fabric an impregnating compound is employed which imparts good electrical insulating properties to the intermediate layers and has a water-repellent action but does not clog the pores of the fabric. Through these pores the air moving in the direction indicated by the arrows 41 can flow without having to overcome too great a resistance. The same construction as shown in Figure 13 is possible with the use of smooth, flexible strips as insulating intermediate layers between the electrodes and the use of electrode strips of close-mesh metallic wire gauze embossed with longitudinal corrugations. In this embodiment the numerals 39 and 40 designate the electrodes and 22 and 23 the insulating intermediate layers.

Figure 14:
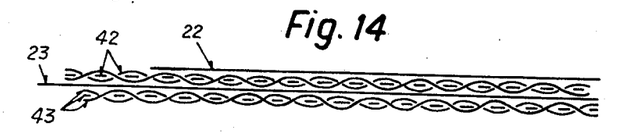
Figs. 14 and 15 show a cross sectional view and top plane view respectively of another embodiment of the separator elements.
Figure 15:
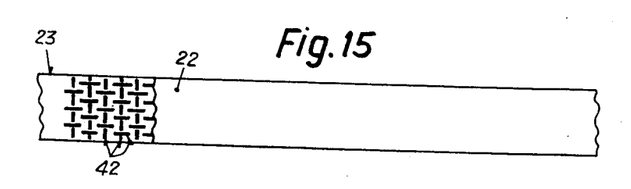

A particularly simple and cheap form of a separator built up by the wrapping or coiling method of construction is diagrammatically shown in Figures 14 and 15, in a typical embodiment, in cross-sectional and plan view respectively. The two electrodes 22 and 23 are again strip-shaped metal foils which are, each with an intermediate layer 42 and 43 respectively, wound jointly about a common central mandrel. The two intermediate layers 42 and 43 are a coarse plaiting of round or flat plastic or textile filaments, narrow bands of straw, cellulose strings, or some other cheap material, the necessary high degree of electrical insulation being ensured either by the material itself or by suitable impregnation and preparation. In the embodiment here discussed it is also possible to use metallized paper or plastic strips instead of the metal foils, in order to economize material. The method of plaiting the intermediate layers 42 and 43 shown diagrammatically in Figures 14 and 15 is not material to the successful functioning of the embodiment, and it is also possible to use diagonal plaiting and/or any other method of plaiting which affords the current of air a sufficient number of possible passages, rectilinear flow-paths being avoided to the greatest extent possible.

A separator constructed in accordance with Figures 14 and 15 may have the respective forms of the electrodes and intermediate layers interchanged without detriment to its efficiency. In this case, 42 and 43 are the two electrode strips, consisting of coarse metallic wire gauze, metal sponge, or similar electrically conducting material. The said electrode strips are insulated from one another by thin insulating foils 22 and 23.

For the protective respirator in accordance with the present invention, the cheap production facility afforded by the exchangeable separator cartridge in accordance with Figures 3 and 4 is of paramount importance, as the solid and/or liquid particles of foreign matter entrained by the stream of air are precipitated on the electrode strips 22 and 23, with the result that after fairly protracted use of the respirator the said separator cartridge must be exchanged. Since the exchangeable cartridge has a solid outer wall 3 and is provided with closing lids 4 and 5 at its front and rear respectively, at least one spare separator cartridge can be carried with him or her by the user of the respirator, for replacement purposes. The radial spokes of the closing lids 4 and 5 prevent damage to the internal electrode system and can be reinforced, if desired, by a close-mesh metallic or fabric gauze, designated by the numeral 43 in Figure 1, applied to the interior of each of the two closing lids. Such a gauze will then also prevent the ingress of coarser impurities into the electrode system.

The protective respirator in accordance with the present invention uses, for the ionization of the air contaminated by entrained solid and/or liquid particles, radioactive substances which predominantly emit alpha particles and whose emission of gamma radiation is negligibly small; more particularly a metallic foil having finely distributed on one of its faces a very thin coating of radium-D, the said foil being stored for at least six months prior to its incorporation in the respirator so that a sufficient quantity of polonium will have formed in the radium-D, which polonium causes the alpha radiation. By the use of radium-D so aged, on the one hand a sufficiently intensive emission of alpha particles to ionize the intake air will be ensured, and on the other hand the almost complete absence of high-penetration gamma rays will be guaranteed, so that no injury to health can be caused by the use of the respirator, by its transportation, or by the storage of large numbers of such respirators.

The slight resistance to flow which the electrode system of the exchangeable separator offers to the air, on the one hand causes practically no impediment to breathing and on the other hand enables the provision of a special outlet valve for exhaled air, such as is necessary in the conventional mechanical protective masks, to be dispensed with. The absorption of sound by the respirator as a whole is also relatively slight, so that speech communication between wearers of such electric respirators is easily possible. In order to diminish or completely to eliminate any loss of insulating efficiency which might be caused in the electrode system by possible precipitations of moisture, the electrode system is, before being incorporated in the exchangeable cartridge, impregnated with a moisture-repellent compound.

A protective respirator with an electrostatic filter will not exhibit the desired separatory action unless the electrode system of the separator is supplied with the prescribed direct-current potential, this being of about 1000 volts in the construction here discussed and a small, portable current supply unit being provided to supply the said potential. Since the capacity of the said unit is of necessity very small, a considerable voltage drop will occur as soon as the current consumption of the electrode system exceeds the normal figure of from 20 to 50 microamperes, which can happen as a result of short-circuiting between the electrodes, excessive moisture, or excessively large quantities of substances precipitated from the air. In order to enable the user of the respirator to be made immediately aware of the arising of such abnormal conditions, which prevent correct functioning of the electrofilter, a dwarf glim-lamp 45 is provided in a protective envelope 44, made for example of rubber, on the tubular extension designated by the numeral 2 in Figures 1 and 2, which glim-lamp can be switched into circuit with the two voltage feeds 21 to the electrode system by means of a push-button switch 46 in the insulating rib 14, and will then, by lighting up, indicate the presence of an operating voltage of the correct order of magnitude. The said pilot glim-lamp also enables it to be ascertained whether, where the correct operating voltage is not present, the electrode system is taking too much current or there is a fault in the current supply unit or in the supply circuit therefrom.

The essential advantage of a protective respirator with an electrostatic filter resides in the excellent separatory efficiency thereof even in respect of the most minute solid and/or liquid particles of sub-microscopic size. On the other hand, no protective action in respect of pure gases can be anticipated, as is afforded by certain mechanical filters whose filter cartridges or inserts are prepared with suitable gas absorbent agents. There is, however, a simple method of combining a protective respirator of the present construction, having an electrostatic filter, with a gas-absorbing mechanical filter. For this purpose the interspaces between the two electrode strips of the electrode system are filled with the absorbent filtering material, so that the current of air, as in the mechanical filter, has to penetrate this material but is at the same time exposed to the transversally-directed electric field of the electrodes.

What I claim is:

1. Electrical precipitation apparatus for protective respirators having a radioactive ionizer and electrostatic separator for particles contained in an air stream, the apparatus comprising means forming an ionizer chamber, said chamber having at least one axially extending inner wall portion, a coating of radioactive material arranged on said wall portion and emitting ionizing rays consisting of predominantly alpha and beta radiation and only a negligibly small amount of gamma radiation, electrode means creating in the region of said ionizing rays an electrical field in said chamber with its flux lines directed predominantly transversally to the direction of the air stream in said chamber, said electrode means being positioned down-stream of the ionizer chamber and a cylindrical electrode supporting member forming with the electrode means an exchangeable filter cartridge.

2. Electrical precipitation apparatus according to claim 1 in which the coating of radioactive material arranged on said wall portion emits predominantly alpha radiation and only a negligibly small amount of gamma radiation.

3. Electrical precipitation apparatus according to claim 1 in which the coating of radioactive material arranged on said wall portion emits predominantly beta radiation and only a negligibly small amount of gamma radiation.

4. Electrical precipitation apparatus as claimed in claim 1, characterized by the fact that rib-like covers are provided for the intake apertures for the air drawn into the ionizer, which covers prevent the ingress of coarse impurities and of splashes of water and render impossible any damaging of the radioactive coating from outside the cover.

5. Electrical precipitation apparatus as claimed in claim 1, characterized by the fact that the radioactive coating in the ionizer is so embedded in the material supporting it that deposition on the radioactive coating of particles entrained by the current of air is prevented.

6. Electrical precipation apparatus as claimed in claim 1, characterized by the fact that the ionizer chamber exhibits, in the direction transversal to the direction of air flow, a sector-shaped cross-section with a vertex angle of not less than 90° and a radius of such dimension as affords the major part of all the alpha particles emitted by the radioactive coating provided at the apex of the sector unobstructed radial emergence into the ionizer chamber and also ensures for the most energetic component of the alpha emission its full range in air.

7. Electrical precipitation apparatus as claimed in claim 6, characterized by the fact that the radioactive coating at the sector apex is applied upon a metallic carrier or support, is gastight-enclosed by a covering layer of only slight absorptive power in respect of the alpha emission, and is connected to one pole of a source of electrical potential the other pole of which is connected to a metallic coating provided on the inner face of the arc defining one side of the sector-shaped cross-section of the ionizer and located opposite the radioactive coating.

8. Electrical precipitation apparatus as claimed in claim 7, characterized by the fact that the metallic carrier of the radioactive coating is connected to the positive pole and the arc-shaped counter-electrode at the periphery of the sector-shaped ionizer chamber is connected to the negative pole of a source of electrical potential.

9. Electrical precipitation apparatus as claimed in claim 6, characterized by the fact that four mutually similar ionizers each having a vertex angle of 90° are assembled to form a four-part ionizer of circular cross-section.

10. Electrical precipitation apparatus for protective respirators, said apparatus comprising a metal rod having a recess formed adjacent the front end thereof, an annular coating of a radioactive substance in said recess, two spaced metal tubes enclosing said rod, a metal container enclosing said tubes and having one end at least partly enclosing the radioactive field produced by said radioactive substance, two separator systems, each consisting of two superposed spirally wound spaced metal strips having inner ends mounted on a metal tube and outer ends attached to said container, whereby said separator systems are located side by side within said container, a metal ring and ribs carrying said metal ring and firmly connected with the rear end of said rod.

11. Electrical precipitation apparatus as claimed in claim 1, characterized by the fact that at the air intake side of the ionizer chamber at least one screen or stop is provided which prevents the entry of air into those regions of the ionizer chamber in which the ionizing action on the current of air would be insufficient.

12. Electrical precipitation apparatus as claimed in claim 1, characterized by the fact that the electrode system of the electrostatic separator is disposed in a box-like container of circular cross-section which can be readily withdrawn from the respirator from the front of the latter, has two contacts in contact-proof arrangement, and is closed at each of its ends, i. e. front and rear, by a lid composed of thin ribs with a narrow-mesh gauze stretched thereover, whereby only slight resistance is offered to the passage of air but damage to the electrode system in the container, from the exterior, is prevented.

13. Electrical precipitation apparatus as claimed in claim 1, characterized by the fact that at least one of the electrode systems arranged serially in the separator unit consists of two strips of metallic wire gauze which, before being coiled, are embossed with longitudinal corrugations which owing to their strength, are preserved throughout the useful life of the separator unit, said strips of metallic wire gauze being, each together with a thin strip of foil of electrically insulating material, wound or coiled on to a length of thin metal tubing serving as a mandrel, whereby annular, concentric flow-passages, proceeding spirally about the coiling mandrel, are formed for the air moving in the axial direction of the coiling mandrel, in which flow-passages the air passes through a plurality of metallic wire gauze ribs or corrugations and is at the same time constantly exposed to the action of the electrical field produced by the electrical potential connected to the two strips of metallic wire gauze.

14. Electrical precipitation apparatus as claimed in claim 1, characterized by the fact that at least one of the electrode systems arranged serially in the separator unit consists of two strips of metallic wire gauze which, each with a strip of thin foil as an intermediate layer, are wound or coiled about a length of metal tubing serving as a mandrel, thereby forming annular, concentric interspaces proceeding spirally about the mandrel, the metallic wire gauze of which the two electrode strips are formed being plaited from coarse metallic filaments or wires and, even when lying flat on the strips of insulating foil, affording a sufficiently large number of fine channels for the passage of the air flowing in the axial direction of the mandrel, the said air being constantly exposed to the action of the electrical field which is produced by the electrical potential prevailing in the two strips of metallic wire gauze.

15. Electrical precipitation apparatus as claimed in claim 1, characterized by the fact that the electrode systems are impregnated with a water-repellent substance.

16. Electrical precipitation apparatus as claimed in claim 1, characterized by the fact that a miniature glim-lamp fitted to the device within the field of view of the wearer of the mask, and a push-button switch, are provided, the said push button switch enabling the glim-lamp to be switched into circuit with the conductors taking the voltage to the electrode system of the separator, so as to enable the direct-current voltage connected to the said electrode system to be verified.

References Cited in the file of this patent

UNITED STATES PATENTS

| | | |
|---|---|---|
| 1,650,097 | Schmidt | Nov. 22, 1927 |
| 2,067,822 | Biederman | Jan. 12, 1937 |
| 2,381,455 | Jacob | Aug. 7, 1945 |
| 2,593,869 | Fruth | Apr. 22, 1952 |